(12) United States Patent
Champney

(10) Patent No.: US 10,100,866 B2
(45) Date of Patent: Oct. 16, 2018

(54) STAND-OFF WELD STUD

(71) Applicant: NELSON STUD WELDING, INC., Elyria, OH (US)

(72) Inventor: Clark Champney, Florence Township, OH (US)

(73) Assignee: Nelson Stud Welding, Inc., Elyria, OH (US)

(*) Notice: Subject to any disclaimer, the term of this patent is extended or adjusted under 35 U.S.C. 154(b) by 190 days.

(21) Appl. No.: 15/262,297

(22) Filed: Sep. 12, 2016

(65) Prior Publication Data

US 2017/0074313 A1   Mar. 16, 2017

Related U.S. Application Data

(60) Provisional application No. 62/217,802, filed on Sep. 12, 2015.

(51) Int. Cl.
*F16B 37/06* (2006.01)
*F16B 31/06* (2006.01)
*B23K 35/02* (2006.01)

(52) U.S. Cl.
CPC ........ *F16B 37/061* (2013.01); *B23K 35/0288* (2013.01); *F16B 31/06* (2013.01); *F16B 37/06* (2013.01)

(58) Field of Classification Search
CPC .. F16B 5/08; F16B 31/06; F16B 37/06; F16B 37/061

(Continued)

(56) References Cited

U.S. PATENT DOCUMENTS 4,799,842 A * 1/1989 Kreider ............... F16B 37/14
411/171
5,054,980 A * 10/1991 Bidefeld ............ B23K 35/0288
228/2.3

(Continued)

FOREIGN PATENT DOCUMENTS

DE         20119598 U1    4/2003
DE     102005008497 A1   8/2006

OTHER PUBLICATIONS

International Search Report and Written Opinion dated Nov. 21, 2016 in corresponding International Patent Application No. PCT/US2016/051243.

(Continued)

*Primary Examiner* — Roberta S Delisle
(74) *Attorney, Agent, or Firm* — Dickinson Wright PLLC

(57) ABSTRACT

A weld stud including a shank that has a reduced diameter portion, and a larger diameter portion. A weld base is defined on the reduced diameter portion and a flange is positioned on the larger diameter portion. A bore wall extends axially through a face of the flange and into the larger diameter portion. The bore wall has a threaded portion that has a threaded diameter for receiving a fastener. A base diameter of the weld base is smaller than a larger diameter of the larger diameter portion and substantially equal to, or smaller than the threaded diameter. The threaded portion is axially spaced from the face of the flange by a first unthreaded portion, which defines a first unthreaded diameter that is larger than the threaded diameter. These features limit the loads transmitted to the fastener, thus allowing the weld stud to withstand shock loads to prevent fastener failures.

20 Claims, 3 Drawing Sheets

(58) Field of Classification Search
USPC ......... 411/171, 424, 426, 103, 360, 381–382
See application file for complete search history.

(56) References Cited

U.S. PATENT DOCUMENTS

| | | | | |
|---|---|---|---|---|
| 5,493,833 | A * | 2/1996 | Irimies | B21K 1/463 219/98 |
| 7,624,618 | B2 * | 12/2009 | Bader | F01M 11/0408 116/104 |
| 8,425,167 | B2 * | 4/2013 | Miura | B23K 9/201 411/171 |
| 8,641,342 | B2 * | 2/2014 | Drexler | B21K 1/44 411/171 |
| 8,998,549 | B2 * | 4/2015 | Pimper | F16B 35/047 411/107 |
| 2006/0193714 | A1 * | 8/2006 | Werner | B23P 19/04 411/546 |
| 2009/0184569 | A1 * | 7/2009 | Inagaki | B60T 13/567 303/115.3 |
| 2010/0288736 | A1 * | 11/2010 | Miura | B23K 9/207 219/99 |

OTHER PUBLICATIONS

"Stud, Welding, and Arc Shields (Ferrules); Type I, Class 1, 2, 3, and Type II, Class 1, 4, 5, 5A, 6, Carbon Steel, For Direct Energy Arc Welding"; Military Specification Sheet; Jun. 10, 1988; United States.

* cited by examiner

STAND-OFF WELD STUD

CROSS REFERENCE TO RELATED APPLICATIONS

The present application claims priority to U.S. Provisional Patent Application Ser. No. 62/217,802, filed on Sep. 12, 2015, the disclosure of which is hereby incorporated by reference in its entirety as though set forth fully herein.

BACKGROUND OF THE INVENTION

1. Field of the Invention

This invention relates to weld stud fasteners. More specifically, this invention relates to stand-off weld studs configured to enable attachment of components or assemblies to metal structures, such as the interior of a ship.

2. Description of the Prior Art

Weld studs are typically metallic fasteners that are end-welded to a base attachment structure, such as a metal sheet, plate, or beam, using a weld stud welding process. The weld stud welding process allows weld studs to be welded to various metals to eliminate the need for through holes or possibly a requirement for having access to the opposite side of the base material to which the weld stud is being welded. Once attached, the versatility of the weld studs becomes apparent in a wide variety of fastening applications. For example, weld studs are used in appliance and automotive body manufacturing, where the use of screws or alternative fasteners may be undesirable for aesthetic or structural reasons. Bridge builders use weld studs as concrete anchors to hold expansion joints in place. Perhaps the most voluminous utilization of weld studs occurs in the construction industry. There, the headed weld studs are welded to steel beams of steel and concrete girder systems to both prevent shear slippage of concrete on top of the beams and add strength to the systems.

Another highly desirable feature of weld studs is that they may be implemented without puncturing a hole in the attendant base attachment structure. Thus, weld stud welding arguably revolutionized the shipbuilding industry, where the weld studs are ubiquitous. In shipbuilding applications, the weld studs are used to hold or support a variety of loads. For example, shipbuilders use the weld studs to attach components and assemblies, such as cable hangers, pipes, and electrical installations to interior walls, bulkheads, or overhead decks of a vessel.

The weld studs are typically welded to a base attachment structure, and an assembly or load is attached to the head (unwelded free end) of the weld stud. For weld studs having external threads, the attachment is typically made using a nut. For weld stud welds having internal threads, a threaded bolt is typically installed in a tapped hole of the weld stud. The attachment is made using a nut on weld studs having external threads, or using a threaded bolt into weld studs having internal threads.

An extensive range of prior art weld stud designs having both external and internal threads for weld stud welding to ship and other military equipment is covered in detail by Military Specification MIL-S-24149 of the United States Armed Forces. Internally threaded weld studs with reduced diameter weld bases are Class 5 weld studs. Internally threaded weld studs that have a single diameter, and hence lack the reduced diameter weld base, are Class 5A weld studs.

Traditional internally threaded weld studs for either commercial or military use are configured to receive the threaded bolt such that the threaded portion of the bolt and the complementary threaded portion of the weld stud are in direct contact throughout the length of the bolt position installed in the weld stud. Such an assembly is often robust and desirable under static conditions, but it may also be limited in its capacity to sustain extreme dynamic forces such as those effectuated by an exploded ordinance.

In the case of military shipbuilding applications, weld studs (among other equipment mounted on ships) must demonstrate a capacity to withstand mechanical shock loads that could be sustained during wartime service. The United States Armed Forces, for example, uses Military Specification MIL-S-901D to account for such requirements in the testing of equipment mounted on its ships. Mechanical shock introduces physical stresses that may cause the equipment to fail in shear or tension, depending in part on the material comprising the equipment. Therefore, it is important that such equipment, including fasteners, resist the deleterious effects of these shock forces in operation.

Accordingly, there is an unmet need in the art for an improved internally threaded weld stud suitable for efficient installation in military shipbuilding applications, wherein the weld stud provides both a robust load bearing capacity under static conditions while concurrently maintaining its structural integrity by providing the ductility and flexibility necessary to withstand substantial mechanical shock forces acting on the weld stud. Moreover, there is an unmet need for an internally threaded weld stud that is able to cushion and absorb shock loads, rather than transmitting loads, that are greater than the capacity and strength of the bolts installed in the weld stud designs of the prior art.

SUMMARY OF THE INVENTION

According to an aspect of the disclosure, a weld stud is provided that includes a shank that extends about and along a center axis between a first shank end and a second shank end. The shank has a reduced diameter portion that extends axially from the first shank end, and a larger diameter portion that extends axially from the second shank end toward the reduced diameter portion. A weld base is defined at the first shank end for being disposed against and welded to an attachment structure. The larger diameter portion has a larger diameter and the weld base has a base diameter. The shank defines a bore that extends axially into the larger diameter portion of the shank from the second shank end along a bore wall that is defined about the center axis. The bore wall has a threaded portion that has a threaded diameter for receiving a fastener. The base diameter of the weld base is smaller than the larger diameter of the larger diameter portion of the shank and substantially equal to, or smaller than the threaded diameter.

The arrangement of the weld stud having a base diameter of the weld base being smaller than the threaded diameter serves to limit the stresses on the fastener that is secured to the threaded portion of the bore wall and prevent the fastener from failing during an application of external forces against the weld stud and the fastener. More specifically, this relationship between the base diameter and threaded diameter establishes a structural strength of the reduced diameter portion that is weaker than a structural strength of the fastener, thus rendering the weld stud incapable of transmitting shock loads with sufficient energy to break the fastener. In other words, the reduced diameter portion acts as a limiter or weaker element for the weld stud that will absorb shock loads to preserve a connection between the weld stud and an assembly to which it is connected.

According to another aspect of the disclosure, a weld stud is provided that includes a shank that extends about and along a center axis between a first shank end and a second shank end. The shank has a reduced diameter portion that extends axially from the first shank end and a larger diameter portion that extends axially from the second shank end toward the reduced diameter portion. A weld base is defined at the first shank end for being disposed against and welded to an attachment structure. A mounting flange is positioned at the second shank end and extends radially outwardly past the shank. The mounting flange has a flange base at the second shank end and a flange face disposed in spaced relationship with the flange base. The mounting flange and the larger diameter portion of the shank define a bore that extends axially from the flange face along a bore wall defined about the center axis. The bore wall has a threaded portion that has a threaded diameter for receiving a fastener. The threaded portion of the bore wall is axially spaced from the flange face by a first unthreaded portion of the bore wall. The first unthreaded portion defines a first unthreaded diameter that is larger than the threaded diameter to define a ductility zone.

The ductility zone defined by the first unthreaded portion advantageously allows a fastener that is secured to the threaded portion of the bore wall to stretch and move within the ductility zone without engaging the mounting flange during the application of external forces against the weld stud and the fastener, thus resisting failure of the fastener.

DESCRIPTION OF THE ENABLING EMBODIMENTS

Figure 1:
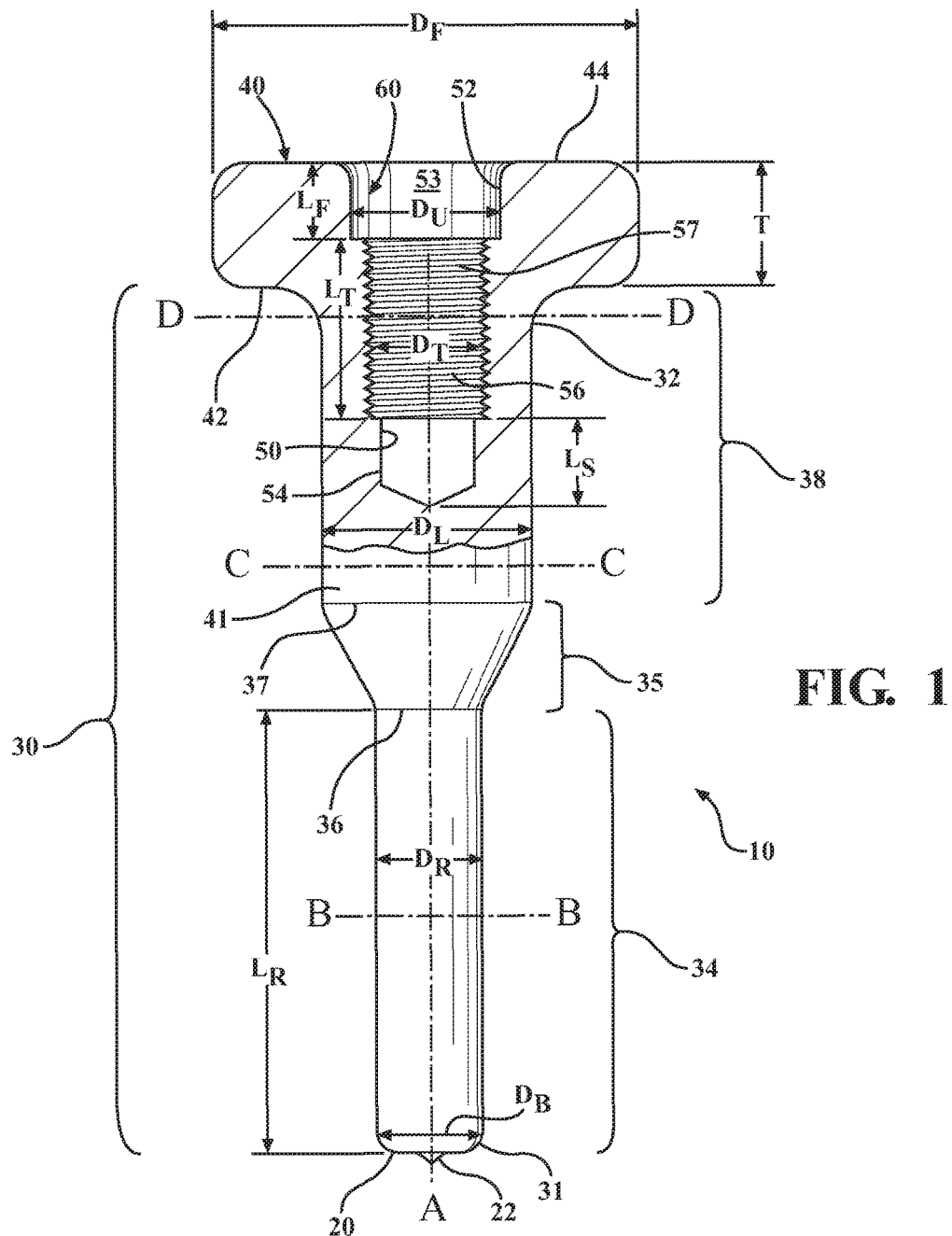
FIG. 1 is a cross-sectional view of a weld stud extending along a longitudinal center axis of the weld stud.
Figure 2:
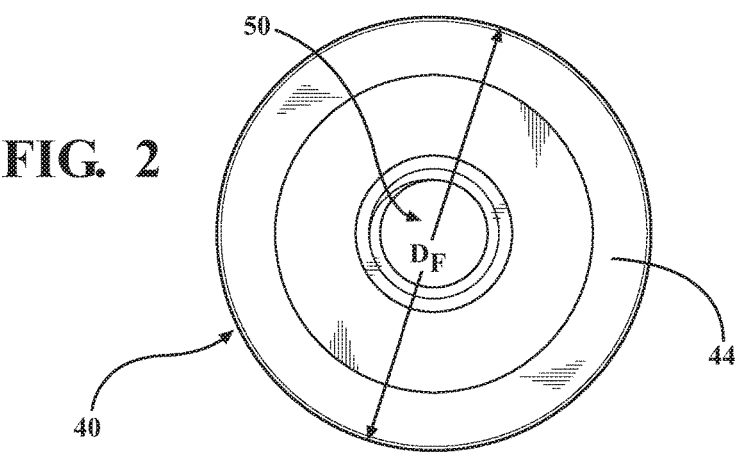
FIG. 2 is a top view of the weld stud illustrating a bore of the weld stud which defines threaded and unthreaded portions.

Referring to the figures, wherein like numerals indicate corresponding parts throughout the several views, a stand-off weld stud 10 is generally shown. As best illustrated in FIGS. 1 and 2, the weld stud 10 generally includes a shank 30 that extends along a center axis A between a first shank end 31 and a second shank end 32. The weld stud 10 is preferably a solitary body that may be formed from any structural material suitable for welding using a weld stud welding process, such as carbon steel, stainless steel, or an aluminum alloy. Of course, numerous known material substitutes may be used, as will be understood by those of ordinary skill in the art without departing from the scope of the subject disclosure.

The shank 30 has a reduced diameter portion 34 that extends axially from the first shank end 31, and a larger diameter portion 38 that extends axially from the second shank end 32 toward the reduced diameter portion 34. The larger diameter portion 38 has a larger diameter $D_L$ and the reduced diameter portion 34 has a reduced diameter $D_R$, with the larger diameter $D_L$ being greater than the reduced diameter $D_R$. A weld base 20 is defined at the first shank end 31 for being disposed against and welded to an attachment structure. The weld base 20 has a base diameter $D_B$ that is substantially the same as, or smaller than the reduced diameter $D_R$. As illustrated, the shank 30 may be substantially cylindrical, however it should be appreciated that other shaped could be utilized including, but not limited to, a cuboid.

The shank 30 further includes a tapered portion 35 that is disposed axially between the larger and reduced diameter portions 38, 34. The tapered portion 35 tapers radially inwardly as it extends axially between the larger and reduced diameter portions 38, 34. The tapered portion 35 has a larger tapered end 37 at the larger diameter portion 38 and with the same diameter as the larger diameter portion 38, and a reduced tapered end 36 at the reduced diameter portion 34 with the same diameter as the reduced diameter portion 34.

Figure 4:
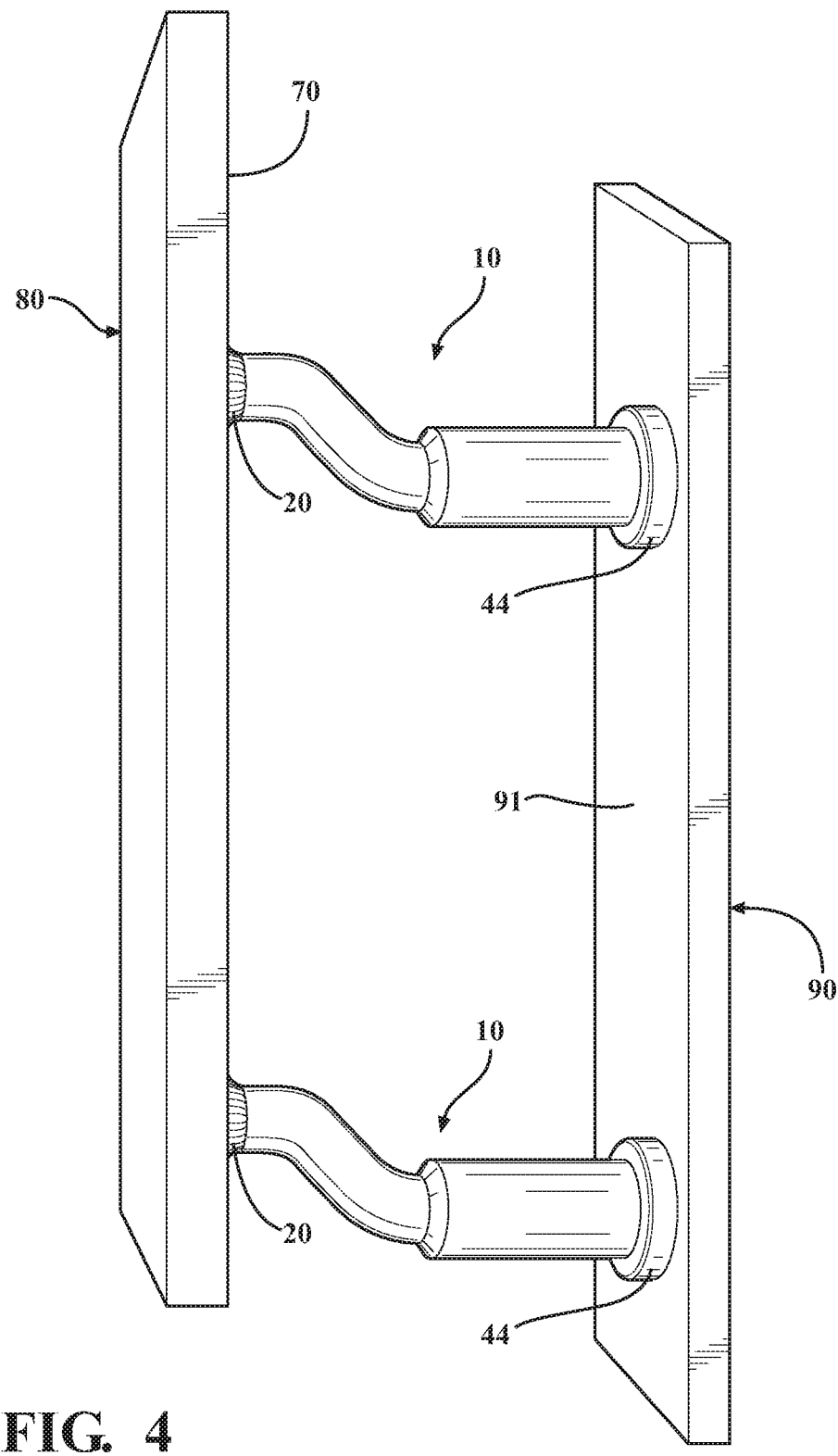
FIG. 4 is a side perspective view of weld studs illustrating the weld studs connected to an attachment face of an assembly at a weld base of each of the weld studs, and connected to an interface portion of a load at a mounting flange of each of the weld studs, and wherein the two weld studs were tested in a rigid assembly, and loading caused displacement of the weld studs by bending at the reduced diameter portion of each weld stud, and wherein the rigid assembly bolted to the mounting flange near the larger diameter portion of each of the weld studs eliminated bending along the larger diameter portion and mounting flange.

A mounting flange 40 is positioned at the second shank end 32 and extends radially outwardly past the shank 30. As illustrated in the figures, the mounting flange 40 may have a generally cylindrical shape, however, it should be appreciated that it could have other shapes including, but not limited to, a cuboid, without departing from the scope of the subject disclosure. The mounting flange 40 has a flange base 42 at the second shank end 32 and a flange face 44 disposed in generally spaced and parallel relationship with the flange base 42. The mounting flange 40 has a flange diameter $D_F$ which is preferably larger than the larger diameter $D_L$, the reduced diameter $D_R$ and base diameter $D_B$. Furthermore, the flange 40 defines a thickness T between the flange face 44 and flange base 42. The preferred thickness T is enough to resist bending when a load transverse to the center axis A of the weld stud 10 is applied. The flange face 44 is configured to engage a load 90, e.g., as illustrated in FIG. 4, about a surface thereof. The greater flange diameter $D_F$ of the face 44, relative to, for example, a weld stud having a shank and head/flange of uniform diameter, provides a greater fulcrum length to better resist bending of the weld stud 10 and bending of the assembly 80 mounted against the flange face 44 for increased load stress resistance.

The mounting flange 40 and the larger diameter portion 38 of the shank 30 define a bore 53 that extends axially from the flange face 44 along a bore wall 50 defined about the center axis and terminates at a certain depth in the larger diameter portion 38 of the shank 30. The bore wall 50 comprises a first unthreaded portion 52, a second unthreaded portion 54, and an internally threaded portion 56. The unthreaded portions 52, 54 define the proximal and distal ends of the bore 53, while the internally threaded portion 56 is disposed between the two unthreaded portions 52, 54. The internally threaded portion 56 includes threads 57 configured to couple with a fastener, such as a threaded bolt (not shown).

As shown in FIG. 1, the weld base 20 preferably comprises a substantially flat surface having radiused corners. In alternative preferred embodiments, the weld base 20 may be substantially conical, also with radiused corners. The weld base 20 is preferably congruent with the first shank end 31 of the shank 30. The weld base 20 includes a centrally located flux 22 to facilitate welding of the weld stud 10 to an attachment surface 70 of an assembly 80 (e.g., see FIG. 4) using an arc welding process. Accordingly, the weld base 20 is the portion of the weld stud 10 that is typically welded to, and thus in physical contact with, the assembly 80.

The reduced diameter portion 34 is solid throughout and extends axially from the first shank end 31 along a reduced length $L_R$ to the reduced tapered end 36. The tapered portion 35 extends along a length of the shank 30 from the reduced tapered end 36 to the larger tapered end 37. The larger diameter portion 38 extends along a length of the shank 30 from the larger tapered end 37 to the second shank end 32, which is preferably partially congruent with the mounting flange base 42. The larger diameter portion 38 comprises a solid portion 41 having a solid cross-section, for example, at C-C, as well as a hollow portion 43 having a cross-section defined by the bore wall 50, for example, at D-D.

In a preferred embodiment, the shank 30 comprises approximately 90% of the overall length of the weld stud 10. In some preferred embodiments, the reduced diameter portion 34, the tapered portion 35, the larger diameter portion 38, and the mounting flange 40 comprise approximately 50%, 10%, 30%, 10% of the length of the weld stud, respectively. Alternative dimensional proportions for these portions 34, 35, 38 and flange 40 about the weld stud 10 are contemplated.

The diameter of the fastener, e.g., bolt, engaging the internally threaded portion 56 should nominally be the same as or greater than the reduced diameter $D_R$ of the reduced diameter portion 34 and base diameter $D_B$ of the weld base 20. Correspondingly, a threaded diameter $D_T$ of the threaded portion 56 should be the same as or greater than the reduced diameter $D_R$ of the reduced diameter portion 34 and base diameter $D_B$ of the weld base 20. This ratio assures that the structural strength of the reduced diameter portion 34 and weld base 20 is weaker than that of the fastener, thus rendering the weld stud 10 incapable of transmitting shock loads with sufficient energy to break the fastener. In other words, the reduced diameter portion 34 and weld base 20 act as a limiter or weaker element that will absorb shock loads to preserve the connection between the weld stud 10 and assembly 80.

As further shown in FIG. 1, the first unthreaded portion 52 of the bore wall 50 defines a ductility zone 60, wherein the internally threaded portion 56 accommodates a complementary fastener, such as bolt. A first unthreaded diameter $D_U$ in the ductility zone 60 is larger than the largest diameter of the shaft of a fastener, and correspondingly the threaded diameter $D_T$. Accordingly, the portion of the bore wall 50 that defines the ductility zone 60 does not contact a fastener having been engaged with the weld stud 10 under normal conditions. It should be appreciated that the ductility zone 60 advantageously allows a fastener that is secured to the threaded portion 56 of the bore wall 50 to stretch and move within the ductility zone 60 without engaging the mounting flange 40 during the application of external forces against the weld stud 10 and the fastener, thus resisting failure of the fastener.

The dimensions of each preferred embodiment of the present invention are governed by certain dimensional parameters. In a preferred arrangement, (i) the cross-sectional area of the weld base 20 (as well as any section of the reduced diameter portion 34 of the shank 30 across axis B-B as shown in FIG. 1) is less than any other diametrical cross-sectional area of the weld stud 10, including the flange 40 and larger diameter portion 38 which define the bore 53; (ii) the cross-sectional area of the second shank end 32, prior to being tapped or drilled to define the bore 53, is preferably at least two (2) times the cross-sectional area of the internally threaded portion 56 defining the bore 53; (iii) the cross-sectional area of the larger diameter portion 38 having been reduced by milling to define the bore 53 at, for example, axis D-D, is greater than the cross-sectional area of the reduced diameter portion 34 at, for example, axis B-B; (iv) the flange diameter $D_F$ of the flange face 44 is preferably at least one and one-half (1.5) times the larger diameter $D_L$ of the larger diameter portion 38 of the shank 30; (v) the ratio of the flange diameter $D_F$ of the flange face 44 to the base diameter $D_B$ of the weld base 20 is preferably 2.5:1; (vi) the ratio of the flange diameter $D_F$ of the flange face 44 to the diameter of bolt is preferably 2.5:1; (vii) the ratio of the surface area of the flange face 44 and the surface area of the weld base 20 is preferably 6.25:1; and the depth of the ductility zone 60, i.e., a first unthreaded length $L_F$ from the flange face 44 to the threaded portion 56, is not less than two threads, and up to half the threaded diameter $D_T$ of the threaded portion 56.

As to parameter (i) listed immediately above, the smaller cross-sectional area of the weld base 20 and reduced diameter portion 34 relative to other cross-sectional areas of the weld stud 10, particularly those that define the bore 53, results in a weld stud 10 that, when welded to attachment surface 70, will advantageously bend under pressure at the weld base 20 as opposed to other locations on the weld stud 10. If, on the other hand, the cross-sectional area of a weld base 20 were the same as or larger than other cross-sectional areas of a weld stud having a threaded bore 53, the weld stud would be more likely fail in shear, tension, or when shock loaded in the other areas when the weld stud is subjected to forces tending to bend, stretch, or displace it. Such forces also tend to cause failure of fasteners engaged with threaded bores of traditional weld studs, whereas the weld stud 10 of the subject invention addresses and resolves such problems.

As to parameter (ii) listed immediately above, a reason for this parameter is that once the shank 30 is drilled and tapped to define the bore wall 50 and bore 53, the remaining material of the larger diameter portion 38 including the internally threaded portion 56 remains structurally significant and configured to receive a threaded fastener, such as bolt. Accordingly, this minimal ratio of cross-sectional surface area of the larger diameter portion 38 to cross-sectional area of the internally threaded portion 56 defining the bore 53 affords the weld stud 10 with adequate material at the second shank end 32 that may be milled (discussed further herein) to provide the structurally advantageous mounting flange 40 of weld stud 10.

The weld stud 10 provided in accordance with preferred embodiments of the present invention may be provided in a wide range of sizes that comport with the aforementioned preferred dimensional parameters. In one preferred embodiment, as shown in FIG. 1, the weld stud 10 is structured to accommodate a standard 0.500 inch-13 Unified National Coarse bolt (56 of ½"-13 UNC) commonly used by the United States Navy in its shipbuilding operations. The weld stud 10 may have the following approximate dimensions: (i) the mounting flange 40 having a flange diameter $D_F$ of 1.250 inches (see also FIG. 2); (ii) the larger diameter portion 38 having a larger diameter $D_L$ of 0.850 inches; (iii) the reduced diameter portion 34 having a reduced diameter $D_R$ of 0.500 inches; (iv) the bore wall 50 having a total depth of 1.500 inches; (v) the first unthreaded portion 52 having a first unthreaded length $L_F$ of 0.250 inches; (vi) the internally threaded portion 56 having a threaded length $L_T$ of 1.000 inches or less; (vii) the second unthreaded portion 54 having a second unthreaded length $L_s$ of 0.250 inches; (viii) the weld stud 10 having an overall length of 3.625 inches; (ix) the mounting flange 40 having a thickness T of 0.375 inches; (x) the larger diameter portion 38 and the tapered portion 35 having a combined length of 1.560 inches; and (xi) the reduced diameter portion 34 having reduced length $L_R$ of 1.625 inches. Accordingly, in this example of a preferred embodiment of the present invention, the ductility zone 60, which is defined by the first unthreaded portion 52, has approximate dimensions of a 0.500 inch first unthreaded diameter $D_U$ and 0.250 inch first unthreaded length $L_F$.

The weld stud 10 of the subject invention may be manufactured from raw metal wire using a method of weld stud manufacture. The raw metal wire is manipulated using a cold forming process to upset the second shank end 32 of the larger diameter portion 38 and form the mounting flange 40 about the second shank 32. The bore 53 ultimately defined by the bore wall 50 may be pierced during formation and then drilled through the mounting flange 40 and shank 30 to a terminal depth of the bore 53 at the second unthreaded portion 54 prior to being internally threaded during further milling of the weld stud 10. The internally threaded portion 56 of the bore wall 50, having a threaded diameter $D_T$ in-between the respective diameters of the unthreaded portions 52, 54, may be provided by tapping the remaining mounting flange 40 thickness and into the shank 30, the internally threaded portion 56 residing between the first and second unthreaded portions 52, 54. Alternatively, the threaded portion 56 may be roll formed without removing additional material from the bore wall 50 of the weld stud 10.

As illustrated in FIG. 4, in operation, the weld stud 10 of the present invention shown in FIG. 1 may be welded at the weld base 20 to an attachment surface 70 and then fastened to a load 90, such as a junction box, at the interface of the flange face 44 and load surface 91. This fastening may be facilitated using a bolt engaged with the internally threaded portion 56 of the weld stud 10. The flange face 44 distributes stress of the load 90 about the load surface 91, thereby serving to resist bending by the load 90 of the surface 91. Additionally, when the load 90 is fastened to the weld stud 10 using, for example, a threaded bolt such as a ½"-13 UNC, the first unthreaded portion 52 does not contact the bolt threads because the bolts threads are disposed in spaced relationship from the first unthreaded portion 52 in the ductility zone 60. Thus, the bolt, being free from the confines of the bore wall 50 that may otherwise counteract the ductility of the bolt, is allowed to stretch within the ductility zone 60 under stress. This serves to increase the tolerance of the bolt to mechanical shock loads and vibration, thereby enhancing the capacity of the bolt to resist mechanical failure.

Performance Testing of Preferred Embodiments of the Present Invention

MIL-S-901 Shock Tests are conducted on three sizes of machines or on barges. The shock test machines use hammers of specific weights mounted on pendulum arms of specific lengths that are swung or dropped from different heights to strike an anvil on which test specimens are mounted in different orientations relative to the direction of the impact. In the barge shock test, a specific weight of explosive is located at several specific depths and locations relative to the barge on which the test specimens are mounted. The criterion for passing the shock test allows the test specimen to bend, sag, deform, etc. as long as the specimen has not been broken and parts have not been detached. A shock test is failed if part of the assembly has broken and detached so that part or any other part is free to move and strike personnel or other parts of the ship.

Numerous features of the weld stud 10 of the present invention serve to increase the ability of the weld stud 10 to withstand impact or shock loads and avoid failure in any of the welds (i.e., at the weld base 20 connection to attachment surface 70), the shank 50, the bore wall 50, or the threads 57. Additionally, the weld stud 10, by its novel and inventive structure, also help mitigate failure of traditional bolts or load surfaces 70 engaged with the weld studs 10 when subjected to impact or shock loads. These features include at least:

1. The base diameter $D_B$ of the weld base 20 is not larger than the threaded diameter $D_T$ of the threads 57 of the bore wall 50 tapped in the larger diameter portion 38 (unwelded end) of the weld stud 10.
2. The reduced length $L_R$ of the reduced diameter portion 34 of the shank 30 is at least twice the base diameter $D_B$ of the weld base 20. The preferred reduced length $L_R$ of the reduced diameter portion 34 is 3 to 4 times the diameter of the weld base 20.
3. The larger diameter portion 38 of the shank 30 has a larger diameter $D_L$ such the cross-sectional area of the remaining wall after the bore 53 is threaded has more than twice the cross-sectional area of a bolt having the same thread size (and of the cross-sectional area of the threaded diameter $D_T$).
4. The threaded length $L_T$ of useable threads 57 in the bore wall 50 in the large diameter portion 38 of the unwelded end of the weld stud 10 is at least 1 ½ times the threaded diameter $D_T$ of the threads 57.
5. A first unthreaded length $L_F$ from the start of the bore wall 50 to the threads 57 (in the ductility zone 60) is approximately ½ the threaded diameter $D_T$.
6. The larger diameter portion 38 (unwelded end) of the weld stud 10 terminates at the mounting flange 40 having a flange face 44 with a flange diameter $D_F$ that is large enough that the area of face 44 is at least 2 times the area of the larger diameter portion 38 of the weld stud 10 that contains the internal threads 57.
7. The total thickness T of the mounting flange 40 is not less than ½ of the threaded diameter $D_T$ of the threads 57. The total thickness T of the mounting flange 40 is approximately ⅓ of the larger diameter $D_L$ of the large diameter portion 38 of the weld stud 10 that contains the internal threads 57.

The importance of and/or reasons for each of the aforementioned features are addressed as follows:

Feature 1: The base diameter $D_B$ of the weld base 20 is not larger than the threaded diameter $D_T$ of the threads 57 of the bore wall 50 tapped in the larger diameter portion 38 (unwelded end) of the weld stud 10.

Shock tests have been conducted on weld studs having a single common diameter for the weld base and the portion of the weld stud length housing the threaded bore wall in the unwelded end of the weld studs. When internally tapped weld studs with a single diameter were shock tested, the significantly greater area and strength of the weld bases was proven to be a liability rather than an advantage. The weld base area of internally tapped weld studs that have one diameter for their entire length will always have a weld base area that is always larger than the area of both the bolt that are installed in the weld studs and the area of the portion of the weld stud that houses the threaded wall of the bore. The size of the tapped hole is usually limited such that the remaining wall will have more area that the area of the bolt. When single diameter internally tapped weld studs with restricted thread sizes have been shock tested, failure of the bolts has been experienced. If a larger size was used for the bore, then the area of the remaining wall would be less than the area of the bolt, and failure of the remaining wall would be experienced.

In order to solve the foregoing issues, the weld base diameter $D_B$ of the weld stud 10 of the subject invention is restricted to a diameter that is not larger than the threaded diameter $D_T$ of the threads 57 that are provided in the bore 53 in the tapped and internally threaded portion 57 of the unwelded end of the weld stud 10. The benefit of restricting the base diameter $D_B$ to no more than the size of the bolt that will be installed in the weld stud 10 is that the strength and capacity of the weld base 20 is restricted so that the strength of the weld base 20 will not be strong enough to cause failure of the bolt. The intended consequence of this restriction is to eliminate failure of the bolts that are installed to retain assemblies. Elimination of failure of these bolts is especially desirable when internally threaded weld studs are utilized on naval ships where failure of the bolts would result in assemblies coming loose.

When internally tapped weld studs 10 of this invention having base diameter $D_B$ of the weld base 20 restricted to not larger than the threaded diameter $D_T$ of the threads T are shock tested, the base diameter 20 does not have the capacity to overstress the bolts and cause the bolts to fail. In standard practice, the risk of bolt failure is even further reduced when the strength grade of the bolts that are installed in the tapped end of the weld stud assemblies 10 are of a strength grade higher than the standard strength ASTM A307/SAE J429, Grade 2 (60,000 pounds per square inch tensile strength) bolts. The higher strength bolts that may be used include ASTM A325/SAE 1429, Grade 5 (120,000 psi) and ASTM A490/SAE J429, Grade 8 (150,000 psi). When internally tapped weld studs 10 of the subject invention having their weld base diameter $D_B$ and reduced diameter $D_R$ restricted to a diameter not larger than the threaded diameter $D_T$ of the threads 57 are subjected to an inline, axial impact shock delivered to the back of the assembly 80 to which the restricted weld base diameter $D_B$ weld studs 10 have been welded, the energy that can be transferred through the reduced diameter $D_R$ of the base 20 of the weld stud 10 during the initial compression phase will be limited by the base diameter $D_B$. Since the weld base diameter $D_B$ and the diameter of the bolt are matched, the force that is transferred to the assembly mounted on the weld stud 10 will not be greater than the strength of the bolt.

Steel is not often thought of as being a flexible material that will both compress and stretch but when enough energy is applied to steel it will compress and stretch. Shock loads will cause acceleration that multiplies the gravitational weight of steel to the point that it will be compressed and stretched. Poisson's Ratio is used to measure compression ratios of materials. Steel has Poisson's Ratio of 0.27-0.30 depending on the hardness of the steel. Stretching of steel is stated in Young's Modulus, Tensile Modulus, or Modulus of Elasticity. Steel has a Young's modulus of 29,000,000 psi. Since steel can be compressed, to some extent, and stretched to some extent, the reduced diameter $D_R$ and base diameter $D_B$ of the weld stud 10 will act as a cushion to some extent and not transfer the full force of the impact delivered to the base 20 of the weld stud 10 to the end of the weld stud 10 that is internally threaded and to whatever assembly is attached to the tapped end of the weld stud 10 by the bolt.

With weld studs 10 of the subject invention having a weld base diameter $D_B$ and reduced diameter $D_R$ not larger than the threaded diameter $D_T$ of the threads, the maximum loads that can be applied to the bolt installed in the threaded hole in the unwelded end of the weld stud 10 are limited to the loads that can be transferred by or through the base diameter $D_B$. The reduced weld base diameter $D_B$ and reduced diameter $D_R$ of the shank 30 of the weld studs 10 of the invention will limit the force that is transferred in both the compression and tension phases of a shock test. During the initial impact or compression phase, sections of the shank 30 with the reduced diameter $D_R$ and base diameter $D_B$ will compress more than a larger diameter would. The additional compression will effectively lower the amount of energy that will be imparted to the load 90 mounted on the flange 40 of the weld stud 10. During the secondary phase, when the assembly 70 to which the weld stud 10 has been welded is attempting to return to its original position, the smaller diameter of the reduced diameter $D_R$ and base diameter $D_B$ will stretch more than a larger diameter would. The stretching will effectively lower the amount of tension that pull on the assembly 70 can apply to the bolt. The total tension that can be applied to the bolt by movement of or impact to either the assembly 70 or the load 90 attached to the flange 40 of the weld stud 10 will be limited to only the strength of the base 20 and reduced diameter portion 34.

The reduced area of the base diameter $D_B$ and reduced diameter $D_R$ on the weld stud 10 of this invention, being smaller and weaker that the area and strength of the bolt installed in the threads 57 in the bore 53 of the unwelded end of the weld stud 10, acts as a more ductile and flexible element that will compress, flex, bend, and stretch. This will delay, reduce, or even eliminate breakage or failure of the bolts installed in the threads 57 of the bore 53 in the unwelded end of weld studs 10 of this invention.

It should be appreciated that the weld stud 10 of the subject invention having similar ratios of dimensions as those described for ½-13 UNC threads may be reproduced for use with smaller or larger threads having imperial or metric dimensions.

Feature 2: The reduced length $R_L$ of the reduced diameter portion 34 is at least twice the base diameter $D_B$ of the weld base 20. The preferred reduced length $R_L$ of the reduced diameter portion 34 is 3 to 4 times the diameter of the base diameter $D_B$.

Figure 3:
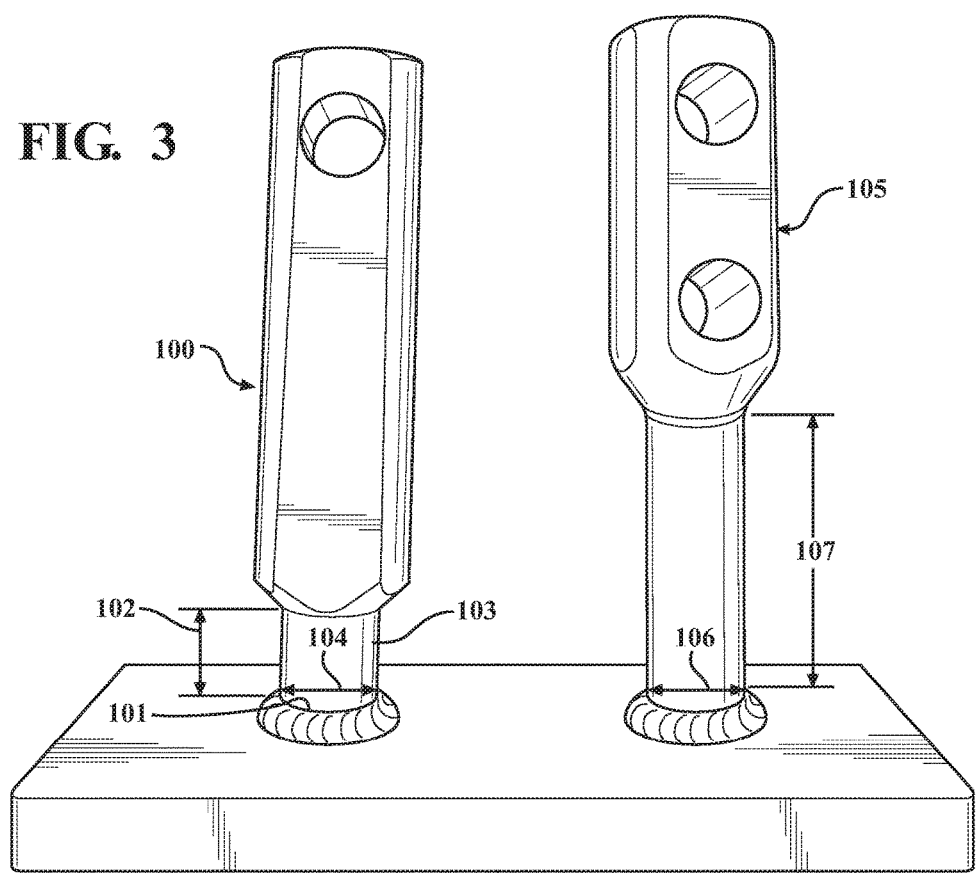
FIG. 3 is a side perspective view of side-by-side weld studs that have different reduced length to base diameter ratios, wherein in shock testing, the weld stud on the left having a 1:1 ratio of the aforementioned features failed, whereas the weld stud on the right having a 3:1 ratio of the aforementioned parameters survived shocking and passed the test.

With reference FIG. 3, shock tests have been conducted on weld studs 100 having weld bases 101 that were ½" diameter (0.1964 sq.in.) that had a reduced length 102 of only ½" long before the area of the weld stud increased to greater than ¾" diameter (0.4418 sq. in.) to accommodate cross drilled holes or an internal thread which could be used to mount assemblies or for attaching loads. The weld studs 100 that had a reduced length 102 of the reduced diameter portion 103 that is the same as the base diameter 104 of the weld base 101 did not pass the shock test.

As also shown in FIG. 3, the same shock test was repeated on weld studs 105 of the same overall length and supporting the same load that had the same ½" diameter (0.1964 sq. in.) weld base diameter 106 and reduced diameter, except the length of the ½" reduced length 107 was increased to 1 ½". The weld studs 105 that had the reduced length 107 increased to three times the base diameter 106 before the weld stud 105 supported the same load and survived both the MIL-901 Shock Testing and MIL-STD-167 Vibration Testing. FIG. 3 shows both the weld stud 100 with the reduced length 102 of 1 (one) times the weld base diameter 104 that failed the shock test and the weld stud 105 with the reduced length 107 of 3 (three) times the weld base diameter 106 that passed the shock test.

Based on this information, internally threaded weld studs with the diameters and lengths of reduced weld bases specified in MIL-S-24149 would not pass the shock testing. The reduced length bases on the internally threaded weld studs specified in MIL-S-24149/1D in Table VIII for the carbon steel Type II, Class 5 weld studs are all one times the diameter or shorter. The length of the reduced weld bases on the internally threaded weld studs specified in MIL-S-24149/3D in Table V for the stainless steel Type V, Class 5 weld studs are all one times the diameter or shorter.

The ratio of the weld base length to diameter of 3:1 or 4:1 for the weld stud of this invention allows the base of the weld studs to flex, stretch or bend when subjected to impact or shock loads.

Description & Features of Weld Studs Used in Tests
  i. Weld base diameter $D_B=\frac{1}{2}"$
  ii. Reduced length $L_R$ after welding =1 ½" (3×dia.)
  iii. Threaded diameter $D_T=\frac{3}{4}"$
  iv. Small mounting flange diameter $D_F=\frac{7}{8}"$
  v. Small flange thickness $T=\frac{3}{16}"$
  vi. Large mounting flange diameter $D_F=1\frac{1}{4}"$
  vii. Large flange thickness $T=\frac{3}{8}"$
  viii. Unthreaded length $L_u$ for ductile zone $=\frac{1}{2}"$
  ix. Total length after welding =3 ⅜"
  x. Bolt size installed in bore 53 of weld studs =½"-13 UNC, Grade 5, Hex head
Tulip Weld stud—Weld stud of this Invention Bend Tests
Flexible Assembly—Small Mounting Flange Surface
Rigid Assembly—Small Mounting Flange Surface
Rigid Assembly—Large Mounting Flange Surface
Tulip Weld Stud Bend Test—Results
Flexible Assembly—Small Mounting Flange Surface—
  Welded to ½" thick steel load—1,240 lbs.
Displacement—1.750"
Approximate Bend Angle—20 Degrees
Rigid Assembly—Small Mounting Flange Surface—
  Welded to ½" thick steel
Load—4,000 lbs.
Displacement—0.920"
Approximate Bend Angle—13 Degrees
The load resisting side of the small mounting flange head surface was crushed. This crushing on the compression side of the head allowed more displacement of the assembly than a larger mounting flange would have allowed.
Rigid Assembly—Large Mounting Flange Surface—
  Welded to 3/16" thick steel
Load—4,200 lbs.
Displacement—0.475"
Approximate Bend Angle—10 Degrees The value of the additional support provided by the larger mounting flange diameter $D_F$ was demonstrated by the results of this test.

The load in the Rigid Assembly—The Large Diameter Mounting Flange test was taken to a higher load than the load applied in the rigid assembly test with the small heads, but the displacement was reduced to almost half and the angle of the bend in the weld studs was also reduced.

In addition, this test was conducted with the ½" base diameter $D_B$ weld studs welded to base material with a thickness of only 0.187". The weld stud 10 with a weld base diameter $D_B$ of 2 ⅔ times the thickness of the base material thickness was strong enough to cause distortion of the base material. The distortion of the base material contributed to the displacement that would not occur if the same weld stud 10 had been welded to thicker base material such as the ½" thick steel used for the previous tests. The base material was, however, thick enough to begin to show a double bend or "S" bending at both the weld base 22 and the transition end where the diameter of the weld stud is increased to house the bore 53 of the hole with the internally threaded surface 57. In this test the large flange diameter $D_F$ of the mounting flange 40 provided enough resistance to cause bending of both the wall of the larger diameter portion 38 of the weld stud 10 housing the bore 53 with the internally threaded surface 57 on the bolts that had been engaged with the internally threaded surface 57. After the conclusion of testing to 4,200 pounds using a calibrated tensile tester, a higher uncalibrated load was applied. This load caused more displacement due to further bending of the bolt and the wall of the larger diameter portion 38 of the weld stud 10. The higher load also started to tear the wall of the bore 53 where the depth of the ductile zone hole 60 had extended slightly deeper than the thickness T of the mounting flange 40.

This test demonstrated that a large larger diameter $D_L$ and area of the larger diameter portion 38 of the weld stud 10 housing the bore 53 of the hole with the internally threaded surface 57 should be utilized to prevent bending in that area and to insure that bending will be forced to occur only in the reduced diameter portion 34 of the shank 30 and weld base 20. This test also demonstrated that the first unthreaded length $L_F$ of the first unthreaded portion 56 in the ductile zone 60 of the weld stud 10 should be restricted to substantially less that the thickness of the flange thickness T to assure that the larger diameter portion 38 of the weld stud 10 housing the bore 53 with the internally threaded surface 57 is not weakened. The first unthreaded length $L_F$ could also be accommodated by a thicker flange 40, a chamfer, or step in the underside of the flange 40 to maintain the cross sectional area and strength to resist bending and tearing.

This test also demonstrated that since the strength of the ½" base diameter $D_B$ weld studs 10 in a rigid assembly is strong enough to cause bending of ½"-13 UNC, Grade 5 bolts then a bolt of a larger diameter and or a higher strength bolt can be supported and used with this weld base diameter $D_B$. This test further demonstrated that a relatively large larger diameter $D_L$ of the larger diameter portion 38 of the weld stud 10 housing the bore 53 of the hole with the internally threaded surface should be utilized to resist bending and support the use of a larger diameter fastener such as a bolt having ⅝"-11 UNC.

Feature 3: The large diameter portion 38 of the weld stud 10 has a larger diameter $D_L$ such that the cross-sectional area of the remaining wall after the bore 53 is threaded is greater than the cross sectional area of a bolt having the same thread size. In order to be capable of supporting and developing the strength of the bolt, the rate of the remaining wall must have more area that the area of the bolt. The selection of the larger diameter $D_L$ and area of the larger diameter portion 38 of the weld stud 10 will also be influenced by a difference, if any, in the grade or tensile strength of the bolts that will be used. In addition, preliminary test results and comparison of the difference in the section modulus of the solid beam of the shank of the weld base 20 and the section modulus of the hollow beam of the larger diameter portion 38 of the weld stud 10 which houses the bore 53 with the threaded portion 52 indicate that the larger diameter $D_L$ and area of the larger diameter portion 38 of the weld stud 10 should be large enough such that they resist the second bend occurring in that portion of the weld stud 10. Increasing the larger diameter $D_L$ and area of the larger diameter portion 38 to make it stronger results in forcing the second "S" bend to occur in the reduced diameter portion 34 of the weld stud shank 30 (as illustrated in FIG. 4).

Feature 4: The threaded length $L_T$ of useable threads 57 in the bore wall 57 in the larger diameter portion 38 of the unwelded end of the weld stud 10 is at least 1 ½" times the diameter of the threads 57. The typical depth of engagement for bolts installed in internally threaded holes used to develop the full strength of the bolts ranges from ⅔ of the bolt diameter up to 1 ½" times the diameter of the bolt. The thickness of thin jam nuts is typically just over ½ the diameter of the bolt. The thickness of standard nuts is approximately ⅞ of the bolt diameter and the thickness of heavy nuts is typically 1 times the bolt diameter. Utilizing a threaded length $L_T$ of 1 ½" times the bolt diameter in the weld stud 10 of this invention provides enough engagement to develop the strength of the bolts and provides some tolerance for variations in the thickness of the assembly that will be mounted on the weld studs 10 and the length of the bolts used for making the attachment.

Feature 6: The larger diameter portion 38 (unwelded end) of the weld stud 10 terminates in an even larger mounting flange 40 having a flange face 44 having a flange diameter $D_F$ large enough that the area of face 44 is at least 2 times the area of the larger diameter portion 38 of the weld stud 10 that contains the internal threads 57. The ductile zone 60 feature provided by the free zone in the first unthreaded portion 52 of the bore 53 in the unwelded end of the weld stud 10 leading to the portion of the bore 53 length having a surface to engage threads on a bolt reduced the probability of breaking the threads by increasing the length of the bolt that is free to elongate and stretch.

In accordance with the foregoing, the weld stud 10 of the subject invention is an improvement over internally threaded weld studs having a single diameter for their entire length. More particularly, a first advantage is that the base diameter $D_B$ and reduced diameter $D_R$ of sufficient length will flex and protect the bolts from being broken during shock testing which simulates exposure to explosions during combat. A secondary advantage is that the reduced base diameter $D_B$ and reduced diameter $D_R$ of the reduced diameter portion 34 of the shank 30 offers a substantial reduction in weight.

Furthermore, the weld stud 10 of the subject invention has the same advantages over internally threaded weld studs having a single common diameter for the weld base and the tapped portion of the weld stud that have a larger diameter mounting flange with the reduction in weight being even greater. More particularly, the tests performed on the weld stud 10 of the subject invention have demonstrated a significant increase in the bend resistance when two or more of the weld studs 10 are attached to a rigid assembly rather than a flexible assembly. In some cases where the weld studs 10 of the subject invention are being used to mount a thin sheet metal assembly to a vertical wall, the installation of a rigid intermediate frame may be installed to increase the resistance to bending so that heavier assemblies may be supported without bending the weld studs 10 or the sheet metal assembly.

It should be appreciated that the rigid intermediate frame installed between weld studs at two different elevations may be in the form of metallic or composite rectangular or square bars, flat sheets, angles, channels or formed "Z" shapes. The rigid intermediate parts may have an assortment of hole or slot patterns to facilitate mounting of different assembles, housings, and equipment. Furthermore, the rigid intermediate parts may be shaped so that they have holes at one elevation for attachment to the weld studs and another elevation for mounting equipment. The shaped rigid intermediate parts with holes at different elevations may be used to increase or decrease the distance that the center of gravity of the mounted assembly is from the surface that the weld stud of this invention has been welded to.

The weld stud 10 of the subject invention may be used in place of rigid mounting assemblies like platform mounts that have internally threaded holes so they can be screwed directly onto externally threaded weld studs. Additionally, the weld stud 10 of the subject invention may be used in place of rigid mounting plates in "C, "L" or Z" shapes with holes in them so they can be installed over externally threaded weld studs and held in place by installing nuts. The rigid mounting assemblies are necessarily stronger that the threaded weld stud or bolts hat are holding them so they have the capacity to cause failure of the weld studs or bolts. The small diameter and length of the weld stud 10 of the subject invention will flex and protect weld studs or bolts from being broken. Additionally, the weld stud 10 of the subject invention is also significantly lighter in weight than the rigid mounting assemblies.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A weld stud comprising;
    a shank extending about and along a center axis between a first shank end and a second shank end;
    said shank having a reduced diameter portion extending axially from said first shank end and a larger diameter portion extending axially from said second shank end toward said reduced diameter portion;
    a weld base defined at said first shank end for being disposed against and welded to an attachment structure;
    said larger diameter portion having a larger diameter and said weld base having a base diameter;
    said shank defining a bore extending axially into said larger diameter portion of said shank from said second shank end along a bore wall defined about said center axis;
    said bore wall having a threaded portion having a threaded diameter for receiving a fastener; and
    said base diameter of said weld base being smaller than said larger diameter of said larger diameter portion of said shank and substantially equal to or smaller than said threaded diameter to minimize stresses on a fastener that is secured to said threaded portion of said bore wall and prevent the fastener from failing during an application of external forces against said weld stud and the fastener.

2. A weld stud as set forth in claim 1 wherein said reduced diameter portion of said shank has a reduced diameter being substantially equal to said base diameter of said weld base.

3. A weld stud as set forth in claim 1 wherein said reduced diameter portion of said shank extends axially along a reduced length, and wherein said reduced length is at least three times said reduced diameter to allow flexing and bending of said reduced diameter portion during the application of external forces against said weld stud and said fastener.

4. A weld stud as set forth in claim 1 further including a mounting flange disposed at said second shank end;
said mounting flange extending radially outwardly past said shank and having a flange base at said second shank end and a flange face disposed in spaced relationship with said flange base;
said bore being further defined by said mounting flange with said bore wall extending axially into said mounting flange face along said center axis; and
said threaded portion of said bore wall being axially spaced from said flange face by a first unthreaded portion of said bore wall, wherein said first unthreaded portion defines a first unthreaded diameter that is larger than said threaded diameter to define a ductility zone for allowing a fastener that is secured to said threaded portion of said bore wall to stretch and move within said ductility zone during the application of external forces against said weld stud and the fastener.

5. A weld stud as set forth in claim 4 further including said bore wall having a second unthreaded portion being axially spaced from said first unthreaded portion by said threaded portion.

6. A weld stud as set forth in claim 5 wherein said second unthreaded portion is axially spaced from said reduced diameter portion of said shank.

7. A weld stud as set forth in claim 4 wherein said threaded portion extends axially along a threaded length, and wherein said threaded length is at least 1.5 times said threaded diameter.

8. A weld stud as set forth in claim 7 wherein said first unthreaded portion of said bore wall defines a first unthreaded length between said flange face and said threaded portion, wherein said first unthreaded length is approximately one half of said threaded diameter.

9. A weld stud as set forth in claim 4 wherein said mounting flange defines a thickness extending between said flange base and said flange face, and wherein said thickness is greater than or equal to one half of said threaded diameter.

10. A weld stud as set forth in claim 9 wherein said thickness is approximately one third or more of said larger diameter of said larger portion of said shank.

11. A weld stud as set forth in claim 4 wherein said mounting flange has a generally cylindrical shape and wherein said flange base and said flange face each extend generally perpendicularly to said center axis in parallel relationship with one another.

12. A weld stud as set forth in claim 4 wherein said flange face defines a flange diameter and a flange area within said flange diameter, and wherein said larger diameter portion of said shank has a first larger diameter portion area within said larger diameter of said larger diameter portion, and wherein said flange area is at least twice said first larger diameter portion area.

13. A weld stud as set forth in claim 12 wherein said bore wall defines a bore area within said bore diameter, and said larger diameter portion defines a second larger diameter portion area being the difference between said first larger diameter portion area and said bore diameter, and wherein said second larger diameter portion area is greater than said bore diameter.

14. A weld stud as set forth in claim 1 wherein said shank further includes a tapered portion disposed axially between said larger and reduced diameter portions, wherein said tapered portion tapers radially inwardly between said larger and reduced diameter portions.

15. A weld stud as set forth in claim 14 wherein said tapered portion has a larger tapered end at said larger diameter portion and having the same diameter as said larger diameter portion, and said tapered portion has a reduced tapered end at said reduced diameter portion and having the same diameter as said reduced diameter portion.

16. A weld stud including:
a shank extending about and along a center axis between a first shank end and a second shank end;
said shank having a larger diameter portion extending axially from said first shank end and a reduced diameter portion extending axially from said second shank end toward said larger diameter portion;
a weld base defined at said second shank end for being disposed against and welded to an attachment structure;
a mounting flange at said second shank end and extending radially outwardly past said shank and having a flange base at said second shank end and a flange face disposed in spaced relationship with said flange base;
said mounting flange and said larger diameter portion of said shank defining a bore extending axially from said mounting flange face along a bore wall defined about said center axis;
said bore wall having a threaded portion having a threaded diameter for receiving a threaded fastener; and
said threaded portion of said bore wall being axially spaced from said flange face by a first unthreaded portion of said bore wall, wherein said first unthreaded portion defines a first unthreaded diameter that is larger than said threaded diameter to define a ductility zone for allowing a threaded fastener that is secured to said threaded portion of said bore wall to stretch and move within said ductility zone during the application of external forces against said weld stud and the fastener.

17. A weld stud as set forth in claim 16 wherein said threaded portion extends axially along a threaded length, and wherein said threaded length is at least 1.5 times said threaded diameter.

18. A weld stud as set forth in claim 16 wherein said first unthreaded portion of said bore wall defines a first unthreaded length between said flange face and said threaded portion, wherein said first unthreaded length is one half of said threaded diameter.

19. A weld stud as set forth in claim 16 wherein said mounting flange defines a thickness extending between said flange base and said flange face, and wherein said thickness is greater than or equal to one half of said threaded diameter.

20. A weld stud as set forth in claim 16 wherein said larger diameter portion of said shank has a larger diameter, and wherein thickness of said mounting flange is approximately one third or more of said larger diameter.

* * * * *

UNITED STATES PATENT AND TRADEMARK OFFICE
CERTIFICATE OF CORRECTION

PATENT NO. : 10,100,866 B2  
APPLICATION NO. : 15/262297  
DATED : October 16, 2018  
INVENTOR(S) : Clark Champney Page 1 of 1

It is certified that error appears in the above-identified patent and that said Letters Patent is hereby corrected as shown below:

In the Specification

Column 13, Line 6 "1 ½′″" should read – "1 ½"

Column 13, Line 10 "1 ½′″" should read – "1 ½"

Column 13, Line 15 "1 ½′″" should read – "1 ½"

Signed and Sealed this  
Eighteenth Day of December, 2018

Andrei Iancu  
*Director of the United States Patent and Trademark Office*